Patented Jan. 4, 1944

2,338,494

UNITED STATES PATENT OFFICE 2,338,494

REACTION PRODUCT OF ALDEHYDES AND TRIAZINE DERIVATIVES

Gaetano F. D'Alelio and James W. Underwood, Pittsfield, Mass., assignors to General Electric Company, a corporation of New York No Drawing. Application September 12, 1942, Serial No. 458,130

20 Claims. (Cl. 260—42)

This invention relates to the production of new synthetic materials and especially to new reaction products having particular utility in the plastics and coating arts. Specifically the invention is concerned with compositions of matter comprising a condensation product of ingredients comprising an aldehyde, including polymeric aldehydes, hydroxyaldehydes and aldehyde-addition products, e. g., formaldehyde, paraformaldehyde, dimethylol urea, trimethylol melamine, aldol, glycollic aldehyde, etc., and a poly-(triazinyl hydrazino) derivative of a polycarboxylic acid corresponding to the general formula:

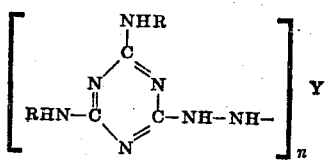

In the above formula R represents a member of the class consisting of hydrogen and monovalent hydrocarbon and substituted hydrocarbon radicals, more particularly halohydrocarbon radicals, Y represents a polyacyl radical of a polycarboxylic acid, more particularly an aliphatic or an aromatic polycarboxylic acid, said polyacyl radical being a member of the class consisting of polyacyl radicals of a polycarboxylic acid wherein the acyl groups are attached directly to each other, polyacyl radicals of a polycarboxylic acid wherein the acyl groups are attached directly to a hydrocarbon radical, and polyacyl radicals of a polycarboxylic acid wherein the acyl groups are attached directly to a halo-hydrocarbon radical, and $n$ represents an integer having a value equal to the valency of the polyacyl radical of Y. Instead of the symmetrical triazine (s-triazine) derivatives represented by the above formula, corresponding derivatives of the asymmetrical triazines or of the vicinal triazines may be employed.

This application is a continuation-in-part of our copending application Serial No. 455,811, filed August 22, 1942, and assigned to the same assignee as the present invention.

Illustrative examples of radicals that R in the above formula may represent are: aliphatic (e. g., methyl, ethyl, propyl, isopropyl, butyl, secondary butyl, isobutyl, butenyl, amyl, isoamyl, hexyl, octyl, allyl, methallyl, ethallyl, crotyl, etc.), including cycloaliphatic (e. g., cyclopentyl, cyclopentenyl, cyclohexyl, cyclohexenyl, cycloheptyl, etc.); aryl (e. g., phenyl, diphenyl or xenyl, naphthyl, anthracyl, etc.); aliphatic-substituted aryl (e. g., tolyl, xylyl, ethylphenyl, propylphenyl, isopropylphenyl, allylphenyl, 2-butenylphenyl, tertirary-butylphenyl, etc.); aryl-substituted aliphatic (e. g., benzyl, phenylethyl, cinnamyl, phenylpropyl, etc.); and their homologues, as well as those groups with one or more of their hydrogen atoms substituted by, for example, a halogen, more particularly chlorine, bromine, fluorine or iodine. Specific examples of halogeno-substituted hydrocarbon radicals that R in the above formula may represent are: chloromethyl, chloroethyl, chlorophenyl, dichlorophenyl, ethyl chlorophenyl, chlorocyclohexyl, phenyl chloroethyl, bromoethyl, bromopropyl, iodophenyl, fluorophenyl, bromotolyl, etc. Preferably R in Formula I is hydrogen, in which case the compounds may be represented by the general formula:

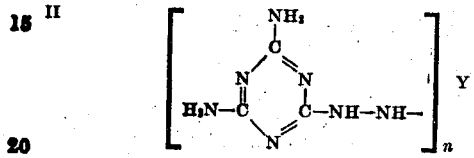

where $n$ and Y have the same meanings as given above with reference to Formula I.

Illustrative examples of polyacyl radicals that Y in Formulas I and II may represent are: aliphatic polyacyl (e. g., oxalyl, malonyl, succinyl, glutaryl, adipyl, tricarballylyl, etc.), including unsaturated aliphatic polyacyl (e. g., maleyl, fumaryl, glutaconyl, itaconyl, citraconyl, mesaconyl, glutinyl, aconityl, muconyl, etc.); and aromatic polyacyl, e. g., phthalyl, naphthalyl, trimesyl, chlorophthalyl, bromophthalyl, isophthalyl, terephthalyl, etc. Preferably Y is a succinyl or a phthalyl radical.

The poly-(triazinyl hydrazino) derivatives of polycarboxylic acids that are used in carrying the present invention into effect are more fully described and are specifically claimed in our parent copending application Serial No. 455,811. As pointed out in this copending application, a method of preparing the triazine derivatives used in practicing the present invention comprises effecting reaction in the presence of a hydrohalide acceptor, e. g., a tertiary amine such as a trialkyl or a triaryl amine, between (1) a triazine derivative corresponding to the general formula

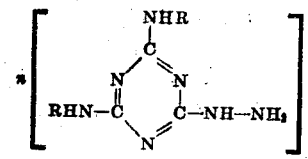

and (2) an acyl halide corresponding to the general formula $YX_n$, where X represents a halogen atom, and $n$, Y and R have the same meanings as given above with reference to Formula I, each halogen atom represented by X being linked directly to a carbon atom of a carbonyl group of the polyacyl radical represented by Y.

Examples of compounds embraced by Formula I that may be used in producing our new condensation products are listed below:

Alpha,beta-bis-(diamino s-triazinyl hydrazinocarbonyl) ethane
Bis-(diamino s-triazinyl hydrazinocarbonyl)
Alpha,beta-bis-[di-(methylamino) hydrazinocarbonyl] ethane
Alpha,beta,gamma-tri-(diamino s-triazinyl hydrazinocarbonyl) propane
Bis-(diamino s-triazinyl hydrazinocarbonyl) benzenes
Bis-[di-(methylamino) s-triazinyl hydrazinocarbonyl] methane
Bis-(diamino s-triazinyl hydrazinocarbonyl) methane
Alpha,omega-bis-(diamino s-triazinyl hydrazinocarbonyl) butane
Alpha,beta-bis-[di-(ethylamino) s-triazinyl hydrazinocarbonyl] ethane
Bis-(dianilino s-triazinyl hydrazinocarbonyl) methane
Bis-[di-(isobutylamino) s-triazinyl hydrazinocarbonyl] methane
Alpha,beta-bis-(diamino s-triazinyl hydrazinocarbonyl) ethene
Bis-(diamino s-triazinyl hydrazinocarbonyl) pentanes
2,3-bis-(diamino s-triazinyl hydrazinocarbonyl) 1-propene
Alpha,beta-bis-(diamino s-triazinyl hydrazinocarbonyl) butane
Bis-(diamino s-triazinyl hydrazinocarbonyl) chlorobenzenes
Bis-(diamino s-triazinyl hydrazinocarbonyl) naphthalenes
Bis-[di-(methylamino) s-triazinyl hydrazinocarbonyl] benzenes
Bis-(4-anilino 6-amino s-triazinyl-2 hydrazinocarbonyl) methane
Bis-(4-methylamino 6-amino s-triazinyl-2 hydrazinocarbonyl)
Bis-(4-anilino 6-methylamino s-triazinyl-2 hydrazinocarbonyl) benzenes
Bis-(ditoluido s-triazinyl hydrazinocarbonyl) benzenes
Alpha,beta-bis-(dixylidino s-triazinyl hydrazinocarbonyl) ethane
Alpha,beta-bis-[di-(phenethylamino) s-triazinyl hydrazinocarbonyl] ethane
Bis-[di-(ethylanilino) s-triazinyl hydrazinocarbonyl] benzenes
1,3,5-tri-(diamino s-triazinyl hydrazinocarbonyl) benzene
Bis-(diamino s-triazinyl hydrazinocarbonyl) bromobenzenes
Bis-[di-(chloromethylamino) s-triazinyl hydrazinocarbonyl]
Bis-[di-(bromoanilino) s-triazinyl hydrazinocarbonyl] methane
Bis-[di-(allylamino) s-triazinyl hydrazinocarbonyl] methane
Bis-[di-(cyclohexylamino) s-triazinyl hydrazinocarbonyl] ethanes
Bis-[di-(octylamino) s-triazinyl hydrazinocarbonyl] propanes
Bis-[di-(iodotoluido) s-triazinyl hydrazinocarbonyl] isopentanes
Bis-(diamino s-triazinyl hydrazinocarbonyl) chloropropanes
Bis-[di-(bromoanilino) s-triazinyl hydrazinocarbonyl] heptanes
Bis-[di-(chlorotoluido) s-triazinyl hydrazinocarbonyl] benzenes
Bis-[di-(fluoroanilino) s-triazinyl hydrazinocarbonyl] butanes
Bis-[di-(cyclohexenylamino) s-triazinyl hydrazinocarbonyl] naphthalenes
Bis-[di-(pentylamino) s-triazinyl hydrazinocarbonyl] chloronaphthalenes
Bis-[di-(xenylamino) s-triazinyl hydrazinocarbonyl] xylenes
Bis-[di-(naphthylamino) s-triazinyl hydrazinocarbonyl] ethylbenzenes
Bis-[di-(chloroethylamino) s-triazinyl hydrazinocarbonyl] toluenes
Bis-[di-(butylamino) s-triazinyl hydrazinocarbonyl] propanes
Bis-[di-(bromopropylamino) s-triazinyl hydrazinocarbonyl] butanes
Alpha,beta-bis-[di-(propenylamino) s-triazinyl hydrazinocarbonyl] propane
Bis-(diamino s-triazinyl hydrazinocarbonyl) toluenes
Bis-(diamino s-triazinyl hydrazinocarbonyl) xylenes
Bis-(dianilino s-triazinyl hydrazinocarbonyl) ethanes
Bis-(ditoluido s-triazinyl hydrazinocarbonyl) ethanes It will be noted that the above list of compounds embraced by Formula I includes both poly-(diamino s-triazinyl hydrazinocarbonyl)-substituted aliphatic hydrocarbons, more particularly bis-(diamino s-triazinyl hydrazinocarbonyl) alkanes and alkenes, and poly-(diamino s-triazinyl hydrazinocarbonyl)-substituted aromatic hydrocarbons.

The present invention is based on our discovery that new and valuable materials having particular utility in the plastics and coating arts can be produced by effecting reaction between ingredients comprising essentially an aldehyde, including polymeric aldehydes, hydroxyaldehydes and aldehyde-addition products, and a triazine derivative of the kind embraced by Formula I, numerous examples of which have been given above and in our parent copending application Serial No. 455,811. Due to the numerous reactive positions in the triazine derivatives employed in practicing our invention, cured resinous aldehyde-reaction products prepared therefrom are outstanding in their resistance to water and organic solvents. The gloss and general appearance of molded articles made from molding compounds containing these new resins in heat-convertible state also are exceptionally good. Other improved properties, including improved plasticity combined with rapid-curing characteristics and, also, high resistance to heat and abrasion in the cured state, make the products of the present invention suitable for use in fields of utility, for instance in electrically insulating applications, for which resinous materials of lesser resistance to heat, water, abrasion and organic solvents would be wholly unsuited.

It has been known heretofore that resinous materials can be prepared by effecting reaction between an aldehyde and certain aminotriazines, e. g., melamine, ammeline and thioammeline ethers. While such resins are suitable for numerous industrial applications, they are not entirely satisfactory for some uses where optimum heat-, water- and abrasion-resistance are required. Furthermore, in some cases their curing characteristics and plastic flow during molding are inadequate for the high-speed molding technique required for economical and efficient molding operations. These and other production difficulties and deficiencies in useful properties of the resin are obviated by creating a synthetic composition from ingredients comprising essentially an aldehyde and a triazine derivative of the kind embraced by Formula I.

In practicing our invention the initial condensation reaction may be carried out at normal or at elevated temperatures, at atmospheric, sub-atmospheric or super-atmospheric pressures, and under neutral, alkaline or acid conditions. Preferably the reaction between the components is initiated under alkaline conditions.

Any substance yielding an alkaline or an acid aqueous solution may be used in obtaining alkaline or acid conditions for the initial condensation reaction. For example, we may use an alkaline substance such as sodium, potassium or calcium hydroxides, sodium or potassium carbonates, mono-, di- or tri-amines, etc. In some cases it is often desirable to cause the initial condensation reaction between the components to take place in the presence of a primary condensation catalyst and a secondary condensation catalyst. The primary catalyst advantageously is either an aldehyde-non-reactable nitrogen-containing basic tertiary compound, e. g., tertiary amines such as trialkyl (e. g., trimethyl, triethyl, etc.) amines, triaryl (e. g., triphenyl, tritolyl, etc.) amines, etc., or an aldehyde-reactable nitrogen-containing basic compound, for instance ammonia, primary amines (e. g., ethyl amine, propyl amine, etc.) and secondary amines (e. g., dipropyl amine, dibutyl amine, etc.). The secondary condensation catalyst, which ordinarily is used in an amount less than the amount of the primary catalyst, advantageously is a fixed alkali, for instance a carbonate, cyanide or hydroxide of an alkali metal (e. g., sodium, potassium, lithium, etc.).

Illustrative examples of acid condensation catalysts that may be employed are inorganic or organic acids such as hydrochloric, sulfuric, phosphoric, acetic, lactic, acrylic, malonic, etc., or acid salts such as sodium acid sulfate, monosodium phosphate, monosodium phthalate, etc. Mixtures of acids, of acid salts or of acids and of acid salts may be employed if desired.

The reaction between the aldehyde, e. g., formaldehyde, and the triazine derivative may be carried out in the presence or absence of solvents or diluents, other natural or synthetic resinous bodies, or while admixed with other materials that also can react with the aldehydic reactant or with the triazine derivative, e. g., urea ($NH_2CONH_2$), thiourea, selenourea, iminourea (guanidine), substituted ureas, thioureas, selenoureas and iminoureas, e. g., aldehyde-reactable urea derivatives such as mentioned in D'Alelio Patent No. 2,285,418, issued June 9, 1942, page 1, column 1, lines 40–49; monoamides of monocarboxylic and polycarboxylic acids and polyamides of polycarboxylic acids, e. g., acetamide, halogenated acetamides (e. g., a chlorinated acetamide), maleic monoamide, malonic monoamide, phthalic monoamide, maleic diamide, fumaric diamide, malonic diamide, itaconic diamide, succinic diamide, phthalic diamide, the monoamide, diamide and triamide of tricarballylic acid, etc.; aminodiazines, e. g., 2,4,6-triaminopyrimidine, etc.; aldehyde-reactable triazines other than the triazine derivatives constituting the primary components of the resins of the present invention, e. g., melamine, ammeline, ammelide, melem, melam, melon, numerous other examples being given in various copending applications of one or both of us, for instance in D'Alelio copending application Serial No. 377,524, filed February 5, 1941, and in applications referred to in said copending application; phenol and substituted phenols, e. g., the cresols, the xylenols, the tertiary alkyl phenols and other phenols such as mentioned, for example, in D'Alelio Patent No. 2,239,441, issued April 22, 1941; monohydric and polyhydric alcohols, e. g., butyl alcohol, amyl alcohol, heptyl alcohol, octyl alcohol, 2-ethylbutyl alcohol, ethylene glycol, propylene glycol, glycerine, polyvinyl alcohol, etc.; amines, including aromatic amines, e. g., aniline, etc.; and the like.

The modifying reactants may be incorporated with the triazine derivative and the aldehyde to form an intercondensation product by mixing all the reactants and effecting condensation therebetween or by various permutations of reactants as described, for example, in D'Alelio Patent No. 2,281,559, issued May 5, 1942 (page 2, column 1, lines 48–69), with particular reference to reactions involving a non-haloacylated urea, a halogenated acylated urea and an aliphatic aldehyde. For instance, we may form a partial condensation product of ingredients comprising (1) urea or melamine or urea and melamine, (2) a triazine derivative of the kind embraced by Formula I, for example bis-(diamino s-triazinyl hydrazinocarbonyl), a poly-(diamino s-triazinyl hydrazinocarbonyl) - substituted aliphatic hydrocarbon, more particularly a bis-(diamino s-triazinyl hydrazinocarbonyl)-substituted alkane such, for instance, as alpha, beta-bis-(diamino s-triazinyl hydrazinocarbonyl) ethane, etc., a poly-(diamino s-triazinyl hydrazinocarbonyl)-substituted aromatic hydrocarbon, e. g., a bis-(diamino s-triazinyl hydrazinocarbonyl) benzene, etc., and (3) an aldehyde, including polymeric aldehydes, hydroxyaldehydes and aldehyde-addition products, for instance formaldehyde, paraformaldehyde, glyceraldehyde, dimethylol urea, a polymethylol melamine, e. g., hexamethylol melamine, etc. Thereafter we may effect reaction between this partial condensation product and, for example, a curing reactant, specifically a chlorinated acetamide, to obtain a heat-curable composition.

Some of the condensation products of this invention are thermoplastic materials even at an advanced stage of condensation, while others are thermosetting or potentially thermosetting bodies that convert under heat or under heat and pressure to an insoluble, infusible state. The thermoplastic condensation products are of particular value as plasticizers for other synthetic resins. The thermosetting or potentially thermosetting resinous condensation products, alone or mixed with fillers, pigments, dyes, lubricants, plasticizers, curing agents, etc., may be used, for example, in the production of molding compositions.

The liquid intermediate condensation products of the invention may be concentrated or diluted further by the removal or addition of volatile solvents to form liquid coating compositions of adjusted viscosity and concentration. The heat-convertible or potentially heat-convertible resinous condensation products may be used in liquid state, for instance as surface-coating materials, in the production of paints, varnishes, lacquers, enamels, etc., for general adhesive applications, in producing laminated articles and for numerous other purposes. The liquid heat-hardenable or potentially heat-hardenable condensation products may be used directly as casting resins, while those which are of a gel-like nature in partially condensed state may be dried and granulated to form clear, unfilled heat-convertible resins.

In order that those skilled in the art better may understand how the present invention may be carried into effect, the following examples are given by way of illustration and not by way of limitation. All parts are by weight.

Example 1

| | Parts |
|---|---|
| Alpha, beta-bis-(diamino s-triazinyl hydrazinocarbonyl) ethane, which also may be named succinyl bis-(diamino s-triazinyl hydrazide) | 145.6 |
| Aqueous formaldehyde (approx. 37.1% HCHO) | 194.4 |
| Aqueous ammonia (approx. 28% NH₃) | 15.0 |
| Sodium hydroxide in 10 parts water | 0.2 |
| Chloroacetamide (monochloroacetamide) | 1.0 |

All of the above ingredients with the exception of the chloroacetamide were heated together under reflux at the boiling temperature of the mass for 15 minutes, yielding a clear, colorless syrup. When a small sample of this syrup was heated on a 140° C. hot plate, it cured slowly to an infusible state. The chloroacetamide was added to the main batch of the syrupy condensation product and refluxing was continued for an additional 5 minutes. The resulting chloroacetamide-modified syrupy resin cured more rapidly than the unmodified syrup to an insoluble and infusible state when a small sample of it was heated on a 140° C. hot plate.

The chloroacetamide-modified syrup was divided into two equal portions. The one portion was mixed with 40 parts alpha cellulose in flock form and 0.2 part of a mold lubricant, specifically zinc stearate, to form a molding (moldable) composition of the cellulose-filled type. The wet molding compound was dried to 65° C. for 1 hour. A sample of the dried and ground molding compound was molded for 4 minutes at 130° C. under a pressure of 2,000 pounds per square inch. The molded piece was well cured throughout, was extremely hard and had a smooth, glossy surface finish. It had outstanding resistance to water as shown by the fact that it absorbed only 0.25% by weight of water when immersed in boiling water for 15 minutes, followed by immersion in cold water for 5 minutes. The molded article showed no evidence of being attacked by this rigid test. The molding compound had good plastic flow during molding.

An asbestos-filled molding compound was made from the other half of the chloroacetamide-modified syrup by mixing therewith 100 parts asbestos and 0.2 part of zinc stearate. The wet molding composition was dried for 2 hours at 64° C. A well-cured molded piece having a good surface appearance and very good resistance to water was obtained by molding a sample of the dried and ground molding compound for 5 minutes at 130° C. under a pressure of 2,000 pounds per square inch. When tested for its water resistance as above described, the molded piece absorbed only 1.19% by weight of water. The molding composition exhibited good plasticity during molding as evidenced by the amount of flash on the molded piece.

Instead of using chloroacetamide in accelerating the curing of the potentially reactive resinous material heat-convertible compositions may be produced by adding to the partial condensation product (in syrupy or other form) direct or active curing catalysts (e. g., citric acid, phthalic anhydride, malonic acid, oxalic acid, etc.), or latent curing catalysts (e. g., sodium chloroacetate, N-diethyl chloroacetamide, glycine ethyl ester hydrochloride, etc.), or by intercondensation with curing reactants other than monochloroacetamide (e. g., di- and tri-chloroacetamides, chloroacetonitriles, alpha,beta-dibromopropionitrile, ethylene diamine hydrochloride, aminoacetamide hydrochloride, the ethanolamine hydrochlorides, nitrourea, chloroacetyl urea, glycine, chloroacetone, sulfamic acid, citric diamide, phenacyl chloride, etc.). Other examples of curing reactants that may be employed to accelerate or to effect the curing of the thermosetting or potentially thermosetting resins of this and other examples are given in various copending applications of one or both of us, for instance in D'Alelio copending applications Serial No. 346,962, filed July 23, 1940, now Patent 2,325,375, and Serial No. 354,395, filed August 27, 1940, now Patent No. 2,325,376, both of which applications issued on July 27, 1943, and are assigned to the same assignee as the present invention.

Example 2

| | Parts |
|---|---|
| Alpha, beta-bis-(diamino s-triazinyl hydrazinocarbonyl) ethane | 43.7 |
| Urea | 28.8 |
| Aqueous formaldehyde (approx. 37.1% HCHO) | 97.2 |
| Aqueous ammonia (approx. 28% NH₃) | 7.5 |
| Sodium hydroxide in 5 parts water | 0.1 |
| Chloroacetamide | 0.5 |

All of the above ingredients with the exception of the chloroacetamide were heated together under reflux at the boiling temperature of the mass for 20 minutes. The chloroacetamide was now added and heating under reflux was continued for an additional 8 minutes. A molding compound was made from the resulting resinous syrup by mixing therewith 40 parts alpha cellulose and 0.2 part zinc stearate. The wet molding composition was dried for 1½ hours at 65° C. A well-cured molded article was obtained by molding a sample of the dried and ground molding compound for 5 minutes at 130° C. under a pressure of 2,000 pounds per square inch. The molding composition showed excellent plastic flow during molding.

Example 3

| | Parts |
|---|---|
| Alpha, beta-bis-(diamino s-triazinyl hydrazinocarbonyl) ethane | 36.4 |
| Para-ureido benzene sulfonamide | 21.5 |
| Aqueous formaldehyde (approx. 37.1% HCHO) | 97.2 |
| Aqueous ammonia (approx. 28% NH₃) | 6.0 |
| Sodium hydroxide in 5 parts water | 0.1 |
| Chloroacetamide | 0.5 |

All of the above ingredients with the exception of the chloroacetamide were heated together under reflux at the boiling temperature of the mass for 10 minutes, after which the chloracetamide was added and refluxing was continued for an additional 5 minutes. The resulting resinous syrup was mixed with 40 parts alpha cellulose and 0.2 part zinc stearate, yielding a molding composition which thereafter was dried for 1 hour at 65° C. A well-cured molded piece was obtained by molding a sample of the dried and ground molding compound for 5 minutes at 130° C. under a pressure of 2,000 pounds per square inch. The molding composition showed good plastic flow during molding.

Example 4

| | Parts |
|---|---|
| Alpha, beta-bis-(diamino s-triazinyl hydrazinocarbonyl) ethane | 36.4 |
| Dimethylol urea | 54.0 |
| Aqueous ammonia (approx. 28% NH₃) | 8.0 |
| Sodium hydroxide in 5 parts water | 0.1 |
| Water | 100.0 |
| Chloroacetamide | 1.0 |

All of the above ingredients with the exception of the chloracetamide were heated together under reflux at the boiling temperature of the mass for 20 minutes. The chloroacetamide was now added and refluxing was continued for an additional 10 minutes. A molding compound was prepared from the resulting resinous syrup by mixing therewith 60 parts alpha cellulose and 0.4 part zinc stearate. The wet molding composition was dried for 1½ hours at 65° C. A well-cured molded piece having an excellent surface appearance and good water resistance was obtained by molding a sample of the dried and ground molding compound for 5 minutes at 130° C. under a pressure of 2,000 pounds per square inch. The molding compound showed good plastic flow during molding.

The dimethylol urea in the above formula may be replaced in whole or in part by an equivalent amount of other aldehyde-addition products, e. g., a methylol melamine, more particularly a polymethylol melamine such, for instance, as trimethylol melamine, hexamethylol melamine, etc.

Example 5

| | Parts |
|---|---|
| Alpha, beta-bis-(diamino s-triazinyl hydrazinocarbonyl) ethane | 109.2 |
| Acrolein | 100.8 |
| Sodium hydroxide in 5 parts water | 0.1 |
| Water | 100.0 | were heated together under reflux at the boiling temperature of the mass for 15 minutes, yielding a yellow resinous mass that cured to an insoluble, infusible state in the absence of an added curing agent when a small sample of it was heated on a 140° C. hot plate. The cured resin was outstanding in its resistance to attack by organic solvents. The resinous condensation product of this example is suitable for use in the preparation of molding compositions.

Example 6

| | Parts |
|---|---|
| Alpha, beta-bis-(diamino s-triazinyl hydrazinocarbonyl) ethane | 109.2 |
| Butyl alcohol | 111.0 |
| Aqueous formaldehyde (approx. 37.1% HCHO) | 145.8 |
| Sodium hydroxide in 5 parts water | 0.1 | were heated together under reflux at the boiling temperature of the mass for 15 minutes, yielding a clear, colorless syrupy resin. This resin was potentially heat-curable as shown by the fact that when a small amount of chloroacetamide, glycine, sulfamic acid or other curing agent such as mentioned under Example 1 was incorporated either into the syrupy condensation product or into the dehydrated resin, followed by heating on a 140° C. hot plate, the material cured to an infusible mass. A portion of the syrup was concentrated by evaporation to a thick resin which was soluble in ethyl alcohol. The resinous material of this example may be used in the preparation of various coating and impregnating compositions. It may be employed as a modifier of varnishes of the aminoplast and alkyd-resin types.

Example 7

| | Parts |
|---|---|
| Alpha, beta-bis-(diamino s-triazinyl hydrazinocarbonyl) ethane | 109.2 |
| Acetamide | 18.0 |
| Aqueous formaldehyde (approx. 37.1% HCHO) | 145.8 |
| Sodium hydroxide in 5 parts water | 0.1 | were heated together under reflux at the boiling temperature of the mass for 15 minutes, yielding a clear, syrupy condensation product. The resinous syrup was potentially heat-curable as shown by the fact that when citric acid, chloroacetamide, phenacyl chloride or other curing agent such as mentioned under Example 1 was incorporated into samples of the syrup, the individual sample cured to an insoluble, infusible state upon heating on a 140° C. hot plate. The plasticity of the modified syrup during curing indicated that the product of this example would be suitable for use as a modifier of less plastic aminoplasts to improve their plasticity.

Example 8

| | Parts |
|---|---|
| Alpha, beta-bis-(diamino s-triazinyl hydrazinocarbonyl) ethane | 109.2 |
| Glycerine | 27.6 |
| Aqueous formaldehyde (approx. 37.1% HCHO) | 145.8 |
| Sodium hydroxide in 5 parts water | 0.1 | were heated together under reflux at boiling temperature for 15 minutes, yielding a thick, resinous syrup having curing characteristics much the same as the syrupy condensation product of Example 7. The resinous material of this example may be used as a modifier of other synthetic resins or in the production of various coating and impregnating compositions.

Example 9

| | Parts |
|---|---|
| Alpha, beta-bis-(diamino s-triazinyl hydrazinocarbonyl) ethane | 109.2 |
| Diethyl malonate | 48.0 |
| Aqueous formaldehyde (approx. 37.1% HCHO) | 145.8 |
| Sodium hydroxide in 5 parts water | 0.1 | were heated together under reflux at the boiling temperature of the mass for 10 minutes, yielding a gel which was rigid at room temperature. The gelled resin melted and then cured to an insoluble and infusible state when a small sample of it was heated on a 140° C. hot plate. The uncured resin was insoluble in water and organic solvents, specifically alcohols.

Example 10

| | Parts |
|---|---|
| Alpha, beta-bis-(diamino s-triazinyl hydrazinocarbonyl) ethane | 109.2 |
| Polyvinyl alcohol | 79.2 |
| Aqueous formaldehyde (approx. 37.1% HCHO) | 145.8 |
| Sodium hydroxide in 5 parts water | 0.1 |
| Water | 150.0 | were heated together under reflux at boiling temperature for 20 minutes, yielding a very viscous syrup that was converted into a tough, thermoplastic film when a small sample of it was heated on a 140° C. hot plate. The addition of an acid, specifically hydrochloric acid, to the syrup in an amount sufficient to lower its pH to about 4.0 yielded a thermosetting resin that cured rapidly to an insoluble, infusible state when a small sample of it was heated on a 140° C. hot plate. The resinous material of this example may be used in the production of molding compositions or it may be employed in the preparation of various liquid coating and impregnating compositions.

It will be understood, of course, by those skilled in the art that the reaction between the aldehyde and the triazine derivative may be effected at temperatures ranging, for example, from room temperature to the fusion or boiling temperature of the mixed reactants or of solutions of the mixed reactants, the reaction proceeding more slowly at normal temperatures than at elevated temperatures in accordance with the general law of chemical reactions. Thus, instead of effecting reaction between the ingredients of Examples 1 to 10, inclusive, under reflux at the boiling temperature of the mass as mentioned in the individual examples, the reaction between the components may be carried out at lower temperatures, for example at temperatures ranging from room temperature to a temperature near the boiling temperature using longer reaction periods and, in some cases, stronger catalysts and higher catalyst concentrations.

It also will be understood by those skilled in the art that our invention is not limited to condensation products obtained by reaction of ingredients comprising an aldehyde and the specific triazine derivative embraced by Formula I that is named in the above illustrative examples. Thus, instead of alpha, beta-bis-(diamino s-triazinyl hydrazinocarbonyl) ethane, we may use, for example, other poly-(diamino s-triazinyl hydrazinocarbonyl)-substituted aliphatic or aromatic hydrocarbons, e. g., bis-(diamino s-triazinyl hydrazinocarbonyl) methane, alpha, beta-bis-(diamino s-triazinyl hydrazinocarbonyl) butane, bis-(diamino s-triazinyl hydrazinocarbonyl), a bis-(diamino s-triazinyl hydrazinocarbonyl) benzene, or any other triazine derivative of the kind embraced by Formula I, numerous examples of which have been given above.

In producing these new condensation products the choice of the aldehyde is dependent largely upon economic considerations and upon the particular properties desired in the finished product. We prefer to use as the aldehydic reactant formaldehyde or compounds engendering formaldehyde, e. g., paraformaldehyde, hexamethylene tetramine, etc. Illustrative examples of other aldehydes that may be used are acetaldehyde, propionaldehyde, butyraldehyde, heptaldehyde, octaldehyde, methacrolein, crotonaldehyde, benzaldehyde, furfural, hydroxyaldehydes (e. g., aldol, glucose, glycollic aldehyde, glyceraldehyde, etc.), mixtures thereof, or mixtures of formaldehyde (or compounds engendering formaldehyde) with such aldehydes. Illustrative examples of aldehyde-addition products that may be used instead of the aldehydes themselves are the mono- and poly-(N-carbinol) derivatives of urea, thiourea, selenourea and iminourea, and of substituted ureas, thioureas, selenoureas and iminoureas, mono- and poly-(N-carbinol) derivatives of amides of polycarboxylic acids, e. g., maleic, itaconic, fumaric, adipic, malonic, succinic, citric, phthalic, etc., mono- and poly-(N-carbinol) derivatives of the aminodiazines, of the aminotriazoles, etc. Particularly good results are obtained with active methylene-containing bodies such as a methylol urea, more particularly mono- and di-methylol ureas, and a methylol melamine, e. g., monomethylol melamine and polymethylol melamines (di-, tri-, tetra-, penta- and hexamethylol melamines). Mixtures of aldehydes and aldehyde-addition products may be used, e. g., mixtures of formaldehyde and methylol compounds such, for instance, as dimethylol urea, trimethylol melamine, hexamethylol melamine, etc.

The ratio of the aldehydic reactant to the triazine derivative may be varied over a wide range depending upon the particular starting reactants employed and the particular properties desired in the finished product. Ordinarily these reactants are employed in an amount corresponding to at last one mol of the aldehyde, specifically formaldehyde, for each mol of the triazine derivative. Thus, we may use, for example, from 1 to 15 or 20 or more mols of an aldehyde for each mol of the triazine derivative. When the aldehyde is available for reaction in the form of an alkylol derivative, more particularly a methylol derivative such, for instance, as dimethylol urea, trimethylol melamine, etc., then higher amounts of such aldehyde-addition products are used, for instance from 2 or 3 up to 35 or 40 or more mols of such alkylol derivatives for each mol of the triazine derivative.

As indicated hereinbefore, and as further shown by a number of the examples, the properties of the fundamental resins of this invention may be varied widely by introducing other modifying bodies before, during or after effecting condensation between the primary components. Thus, as modifying agents we may use, for example, methyl, ethyl, propyl, isopropyl, isobutyl, hexyl, etc., alcohols; polyhydric alcohols such, for example, as diethylene glycol, triethylene glycol, pentaerythritol, etc.; alcohol-ethers, e. g., ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, etc.; amides, e. g., formamide, stearamide, acrylamide, benzene sulfonamides, toluene sulfonamides, adipic diamide, phthalamide, etc.; amines, e. g., ethylene diamine, phenylene diamine, etc.; ketones, including halogenated ketones, etc.; nitriles, including halogenated nitriles, e. g., succinonitrile, acrylonitrile, chloroacetonitriles, etc.; acylated ureas, more particularly halogenated acylated ureas of the kind described, for example, in D'Alelio Patent No. 2,281,559, issued May 5, 1942; and others.

The modifying bodies also may take the form of high molecular weight bodies with or without resinous characteristics, for example hydrolyzed wood products, formalized cellulose derivatives, lignin, protein-aldehyde condensation products, aminodiazine-aldehyde condensation products, aminotriazole-aldehyde condensation products, melamine-aldehyde condensation products, etc. Other examples of modifying bodies are the urea-aldehyde condensation products, the aniline-aldehyde condensation products, phenol-aldehyde condensation products, modified or unmodified, saturated or unsaturated polyhydric alcohol-polycarboxylic acid condensation products, water-soluble cellulose derivatives, natural gums and resins such as shellac, rosin, etc.; polyvinyl compounds such as polyvinyl esters, e. g., polyvinyl acetate, polyvinyl butyrate, etc., polyvinyl ethers, including polyvinyl acetals, specifically polyvinyl formal, etc.

Instead of effecting reaction between a triazine derivative of the kind embraced by Formula I and an aldehyde, specifically formaldehyde, we may cause an aldehyde to condense with a salt (organic or inorganic) of the triazine derivative or with a mixture of the triazine derivative and a salt thereof. Examples of organic and inorganic acids that may be used in the preparation of such salts are hydrochloric, sulfuric, phosphoric, boric, acetic, chloroacetic, propionic, butyric, valeric, acrylic, oxalic, polyacrylic, methacrylic, polymethacrylic, malonic, succinic, adipic, maleic, fumaric, malic, benzoic, salicylic, phthalic, camphoric, etc.

Dyes, pigments, plasticizers, mold lubricants, opacifiers and various fillers, (e. g., wood flour, glass fibers, asbestos, including defibrated asbestos, mineral wool, mica, cloth cuttings, etc.) may be compounded with the resin in accordance with conventional practice to provide various thermoplastic and thermosetting molding compositions.

The modified and unmodified resinous compositions of this invention have a wide variety of uses. For example, in addition to their use in the production of molding compositions, they may be used as modifiers of other natural and synthetic resins, as laminating varnishes in the production of laminated articles wherein sheet materials, e. g., paper, cloth, sheet asbestos, plywood, etc., are coated and impregnated with the resin, superimposed and thereafter united under heat and pressure. They may be used in the production of wire or baking enamels from which insulated wires and other coated products are made, for bonding or cementing together mica flakes to form a laminated mica article, for bonding together abrasive grains in the production of resin-bonded abrasive articles such, for instance, as grindstones, sandpapers, etc., in the manufacture of electrical resistors, etc. They also may be employed for treating cotton, linen and other cellulosic materials in sheet or other form. They also may be used as impregnants for electrical coils and for other electrically insulating applications.

What we claim as new and desire to secure by Letters Patent of the United States is:

1. A composition of matter comprising the product of reaction of ingredients comprising an aldehyde and a compound corresponding to the general formula

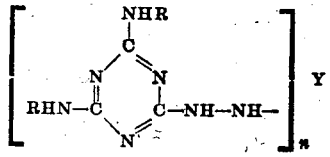

where R represents a member of the class consisting of hydrogen and monovalent hydrocarbon and halo-hydrocarbon radicals, Y represents a polyacyl radical of a polycarboxylic acid, said polyacyl radical being a member of the class consisting of polyacyl radicals of a polycarboxylic acid wherein the acyl groups are attached directly to each other, polyacyl radicals of a polycarboxylic acid wherein the acyl groups are attached directly to a hydrocarbon radical, and polyacyl radicals of a polycarboxylic acid wherein the acyl groups are attached directly to a halo-hydrocarbon radical, and $n$ represents an integer having a value equal to the valency of the polyacyl radical of Y.

2. A composition of matter comprising the product of reaction of ingredients comprising formaldehyde and a compound corresponding to the general formula

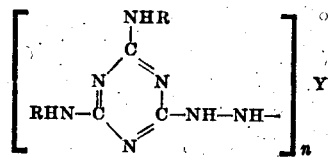

where R represents a member of the class consisting of hydrogen and monovalent hydrocarbon and halo-hydrocarbon radicals, Y represents a polyacyl radical of a polycarboxylic acid, said polyacyl radical being a member of the class consisting of polyacyl radicals of a polycarboxylic acid wherein the acyl groups are attached directly to each other, polyacyl radicals of a polycarboxylic acid wherein the acyl groups are attached directly to a hydrocarbon radical, and polyacyl radicals of a polycarboxylic acid wherein the acyl groups are attached directly to a halo-hydrocarbon radical, and $n$ represents an integer having a value equal to the valency of the polyacyl radical of Y.

3. A composition of matter comprising the product of reaction of ingredients comprising an aldehyde and a compound corresponding to the general formula

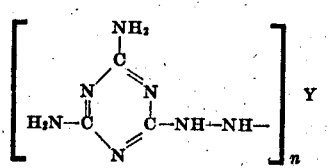

where Y represents a polyacyl radical of an unsubstituted aliphatic polycarboxylic acid and $n$ represents an integer having a value equal to the valency of the polyacyl radical of Y.

4. A composition of matter comprising the product of reaction of ingredients comprising an aldehyde and a compound corresponding to the general formula

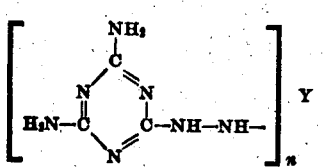

where Y represents a polyacyl radical of an unsubstituted aromatic polycarboxylic acid and $n$ represents an integer having a value equal to the valency of the polyacyl radical of Y.

5. A composition as in claim 1 wherein the reaction product is the product obtained by effecting initial reaction between the stated components under alkaline conditions.

6. A composition as in claim 1 wherein the reaction product is an alcohol-modified reaction product of the stated components.

7. A heat-curable resinous composition comprising the heat-convertible condensation product of ingredients comprising formaldehyde and a compound corresponding to the general formula

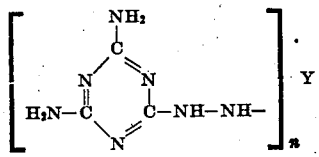

where Y represents a polyacyl radical of a polycarboxylic acid, said polyacyl radical being a member of the class consisting of polyacyl radicals of a polycarboxylic acid wherein the acyl groups are attached directly to each other, polyacyl radicals of a polycarboxylic acid wherein the acyl groups are attached directly to a hydrocarbon radical, and polyacyl radicals of a polycarboxylic acid wherein the acyl groups are attached directly to a halo-hydrocarbon radical, and $n$ represents an integer having a value equal to the valency of the polyacyl radical of Y.

8. A product comprising the cured resinous composition of claim 7.

9. A composition of matter comprising the resinous condensation product of ingredients comprising an aldehyde and a bis-(diamino s-triazinyl hydrazinocarbonyl) alkane.

10. A composition of matter comprising the resinous condensation product of ingredients comprising an aldehyde and alpha,beta-bis-(diamino s-triazinyl hydrazinocarbonyl) ethane.

11. A resinous composition comprising the product of reaction of ingredients comprising formaldehyde and alpha, beta-bis-(diamino s-triazinyl hydrazinocarbonyl) ethane.

12. A composition comprising the resinous condensation product of ingredients comprising an aldehyde and bis-(diamino s-triazinyl hydrazinocarbonyl).

13. A composition comprising the resinous condensation product of ingredients comprising an aldehyde and a bis-(diamino s-triazinyl hydrazinocarbonyl) benzene.

14. A composition comprising the product of reaction of ingredients comprising a urea, an aldehyde and a compound corresponding to the general formula

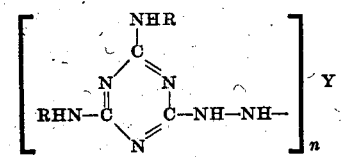

where R represents a member of the class consisting of hydrogen and monovalent hydrocarbon and halo-hydrocarbon radicals, Y represents a polyacyl radical of a polycarboxylic acid, said polyacyl radical being a member of the class consisting of polyacyl radicals of a polycarboxylic acid wherein the acyl groups are attached directly to each other, polyacyl radicals of a polycarboxylic acid wherein the acyl groups are attached directly to a hydrocarbon radical, and polyacyl radicals of a polycarboxylic acid wherein the acyl groups are attached directly to a halo-hydrocarbon radical, and $n$ represents an integer having a value equal to the valency of the polyacyl radical of Y.

15. A composition of matter comprising the product of reaction of ingredients comprising urea, formaldehyde and a compound corresponding to the general formula

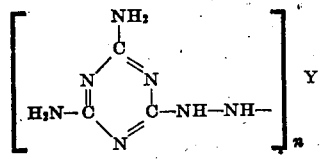

where Y represents a polyacyl radical of a polycarboxylic acid, said polyacyl radical being a member of the class consisting of polyacyl radicals of a polycarboxylic acid wherein the acyl groups are attached directly to each other, polyacyl radicals of a polycarboxylic acid wherein the acyl groups are attached directly to a hydrocarbon radical, and polyacyl radicals of a polycarboxylic acid wherein the acyl groups are attached directly to a halo-hydrocarbon radical, and $n$ represents an integer having a value equal to the valency of the polyacyl radical of Y.

16. A composition comprising the resinous product of reaction of ingredients comprising urea, formaldehyde and alpha, beta-bis-(diamino s-triazinyl hydrazinocarbonyl) ethane.

17. A resinous composition comprising the product of reaction of ingredients comprising dimethylol urea and a bis-(diamino s-triazinyl hydrazinocarbonyl) alkane.

18. A composition comprising the product of reaction of ingredients comprising melamine, an aldehyde and a compound corresponding to the general formula

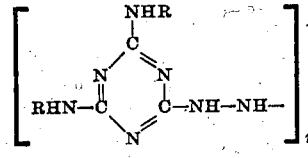

where R represents a member of the class consisting of hydrogen and monovalent hydrocarbon and halo-hydrocarbon radicals, Y represents a polyacyl radical of a polycarboxylic acid, said polyacyl radical being a member of the class consisting of polyacyl radicals of a polycarboxylic acid wherein the acyl groups are attached directly to each other, polyacyl radicals of a polycarboxylic acid wherein the acyl groups are attached directly to a hydrocarbon radical, and polyacyl radicals of a polycarboxylic acid wherein the acyl groups are attached directly to a halo-hydrocarbon radical, and $n$ represents an integer having a value equal to the valency of the polyacyl radical of Y.

19. A heat-curable composition comprising the heat-convertible resinous reaction product of (1) a partial condensation product of ingredients comprising formaldehyde and a compound corresponding to the general formula

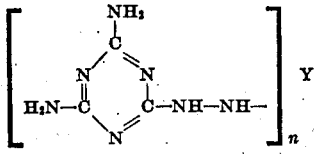

where Y represents a polyacyl radical of a polycarboxylic acid, said polyacyl radical being a member of the class consisting of polyacyl radicals of a polycarboxylic acid wherein the acyl groups are attached directly to each other, polyacyl radicals of a polycarboxylic acid wherein the acyl groups are attached directly to a hydrocarbon radical, and polyacyl radicals of a polycarboxylic acid wherein the acyl groups are attached directly to a halo-hydrocarbon radical, and $n$ represents an integer having a value equal to the valency of the polyacyl radical of Y, and (2) a curing reactant.

20. The method of preparing new synthetic compositions which comprises effecting reaction between ingredients comprising an aldehyde and a compound corresponding to the general formula

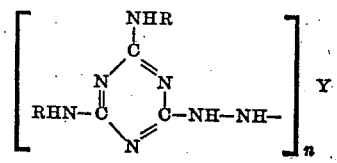

where R represents a member of the class consisting of hydrogen and monovalent hydrocarbon and halo-hydrocarbon radicals, Y represents a polyacyl radical of a polycarboxylic acid, said polyacyl radical being a member of the class consisting of polyacyl radicals of a polycarboxylic acid wherein the acyl groups are attached directly to each other, polyacyl radicals of a polycarboxylic acid wherein the acyl groups are attached directly to a hydrocarbon radical, and polyacyl radicals of a polycarboxylic acid wherein the acyl groups are attached directly to a halo-hydrocarbon radical, and $n$ represents an integer having a value equal to the valency of the polyacyl radical of Y.

GAETANO F. D'ALELIO.
JAMES W. UNDERWOOD.

CERTIFICATE OF CORRECTION.

Patent No. 2,338,494. January 4, 1944.

GAETANO F. D'ALELIO, ET AL.

It is hereby certified that error appears in the printed specification of the above numbered patent requiring correction as follows: Page 1, first column, line 58-59, for "tertirary-" read -- tertiary- --; page 3, first column, line 50, for "presenec" read --presence--; line 59, for "D'Alelo" read --D'Alelio--; page 4, first column, line 41, for "to" read --at--; same page, second column, line 66, and page 5, first column, line 14, for "chloracetamide" read --chloroacetamide--; page 5, second column, line 68, for "polylvinyl" read --polyvinyl--; page 6, first column, line 26, for "uf" read --of--; and that the said Letters Patent should be read with this correction therein that the same may conform to the record of the case in the Patent Office.

Signed and sealed this 11th day of April, A. D. 1944.

Leslie Frazer

(Seal) Acting Commissioner of Patents.